9360X
A. M. McLean,
Cotton Press,
Patented Feb. 5, 1836.
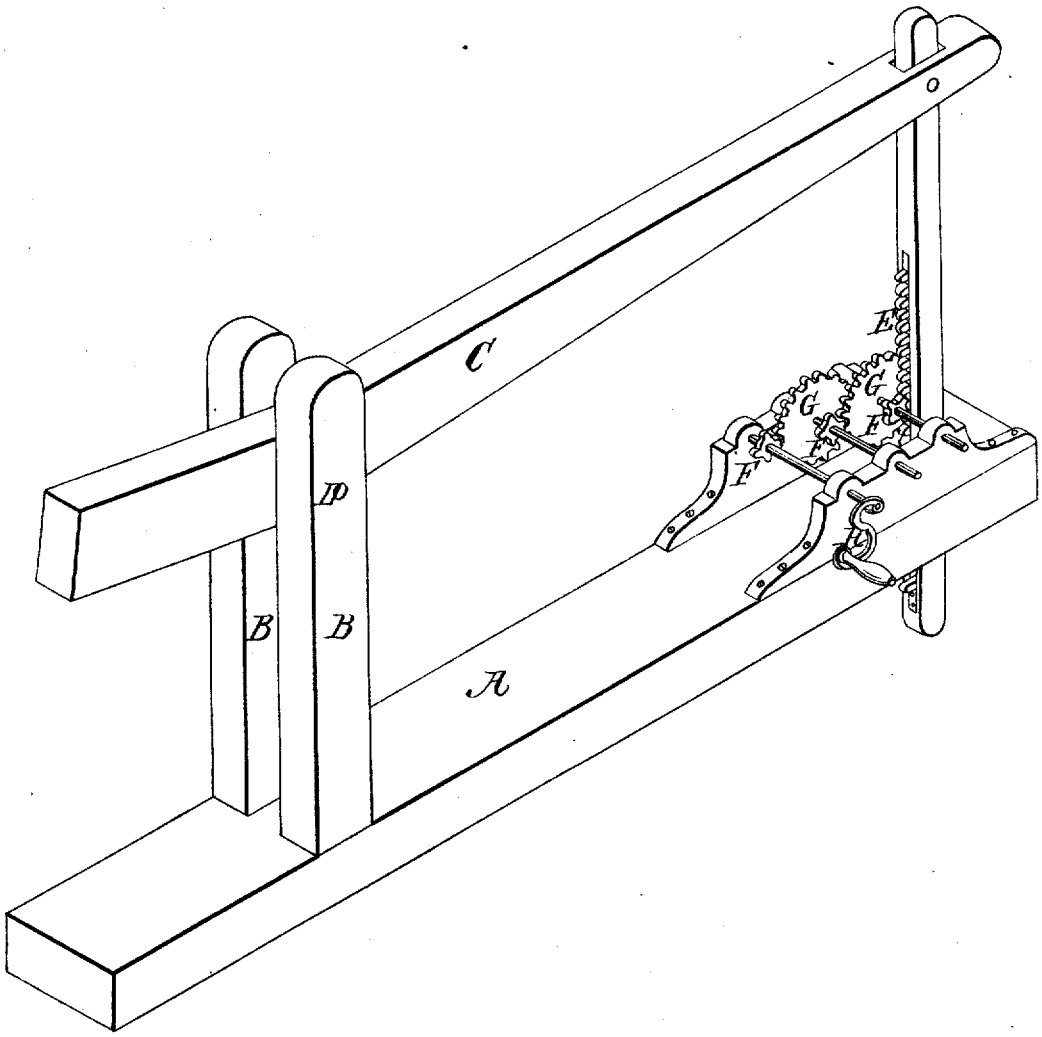
AM. PHOTO-LITHO. CO. N.Y. (OSBORNE'S PROCESS)

2/5/1836 9360X

Feb. 5. 1836 41

Azel M. McLean County of Logan State of Kentucky

The Schedule referred to in these Letters Patent and making part of the same containing a discription in the words of the said Azel M. McLean himself of his improvement in the Press for packing Tobacco Cotton &c

---

To all to whom these presents shall come.

Be it known that I Azel M McLean of the County of Logan and State of Kentucky have invented a new and useful improvement in a Lever press and that the following is a full and exact discription thereof.

A sill or bass, into this sill there are two uprites framed securely about four feet from the end between these uprites at a convenient distance from the sill there is a lever placed and a large bolt which is put through the uprights and the lever about four feet from the end of the lever, The sill and lever are of the same length about eighteen feet and the lever works, directly above the sill there is a rack with teeth the one end of which is fastened into the extreme end of the lever there are three wheels which have teeth or cogs on their circumference which are framed into the end of the sill directly under the rack they are placed so as to multiply power upon the rack a small one works in the rack and a large one on the same axel and another small one on a different axel which is turned by a crank, the ends of the axels are made so as to receive the crank or cranks which are moveable and received on either axel in order to further multiply the pressure, two more wheels are added makeing five in the frame instead of three, all working the same rack and at the same end of the lever.

What I claim as my own invention and not previously known in the above described press is not the principal but an improvement on it which is the projection of the end of the lever that presses directly upon the substance pressed far enough through

2/5/1836 9360X

418.

between the inflated & press machinery being attached to one end of the lever only—

Witnesses
1836 James McCallum
John C Hacy

Azel M McLean, 403 words

Patented 5th February 1836

Examined